US006268849B1

(12) United States Patent
Boyer et al.

(10) Patent No.: US 6,268,849 B1
(45) Date of Patent: *Jul. 31, 2001

(54) INTERNET TELEVISION PROGRAM GUIDE SYSTEM WITH EMBEDDED REAL-TIME DATA

(75) Inventors: Franklin E. Boyer, Cleveland; Timothy B. Demers, Tulsa, both of OK (US)

(73) Assignee: United Video Properties, Inc., Tulsa, OK (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,012

(22) Filed: Jun. 30, 1998

(51) Int. Cl.[7] .............................. G06F 3/00; G06F 15/16; H04N 7/14; H04H 1/02

(52) U.S. Cl. ......................... 345/327; 348/12; 348/906; 455/5.1; 709/217

(58) Field of Search .............................. 345/327; 348/10, 348/12, 13, 906; 455/6.2, 6.3, 5.1, 4.2; 395/200.47, 200.48, 200.49; 709/217–219; H04N 7/173

(56) References Cited

U.S. PATENT DOCUMENTS

| 5,589,892 | 12/1996 | Knee et al. | 348/731 |
| 5,596,373 | * 1/1997 | White et al. | 348/569 |
| 5,629,733 | * 5/1997 | Youman et al. | 348/7 |

(List continued on next page.)

FOREIGN PATENT DOCUMENTS

| 0 723 369 A1 | 7/1996 | (EP) | H04N/7/00 |
| WO 96/27989 | 9/1996 | (WO) | H04N/7/173 |
| WO 96/38962 | 12/1996 | (WO) | H04L/29/06 |
| WO 97/42763 | * 11/1997 | (WO) | H04N/7/173 |

OTHER PUBLICATIONS

The InfoBeat program guide website of InfoBeat, Inc. This website is located at www.infobeat.com (as printed from the Internet on Sep. 1, 1998).

The television program guide website of TV Guide Entertainment Network. This website is located at www.tvguide.com (as printed from the Internet on Sep. 1, 1998).

The television program guide website of Gist Communications, Inc. of New York, New York. This website is located at www.gist.com (as printed from the Internet on Sep. 1, 1998).

The click TV television program guide website of TVData of Queensbury, New York. This website is located at www.clicktv.com (as printed from the Internet on Sep. 1, 1998).

(List continued on next page.)

Primary Examiner—John W. Miller
(74) Attorney, Agent, or Firm—Fish & Neave; Brajesh Mohan

(57) ABSTRACT

An Internet television program guide system is provided that allows a user at a multimedia system to access television program listings containing embedded real-time data over an Internet communications link. The television program listing may be for a sporting event that is currently being broadcast and the real-time data may be the current score of the event, the current weather where the event is taking place, or any other suitable real-time information on the event. The real-time data may be presented in the form of video stills, video clips, textual information, audio clips, or suitable combinations of such media. The user can perform database searches on the program guide listings to search for a desired program. If desired, the user can obtain additional information on a selected program by accessing an associated web page.

64 Claims, 14 Drawing Sheets

U.S. PATENT DOCUMENTS

| | | | |
|---|---|---|---|
| 5,692,214 | | 11/1997 | Levine .................................. 395/833 |
| 5,721,827 | * | 2/1998 | Logan et al. .................... 395/200.47 |
| 5,790,202 | * | 8/1998 | Kummer et al. ...................... 348/553 |
| 5,828,839 | * | 10/1998 | Moncreiff ........................ 395/200.34 |
| 5,828,945 | * | 10/1998 | Klosterman ........................... 455/4.2 |
| 5,850,218 | * | 12/1998 | LaJoie et al. ........................ 345/327 |
| 6,002,394 | * | 12/1999 | Schein et al. ........................ 345/327 |
| 6,052,145 | | 4/2000 | Macrae et al. ......................... 348/10 |

OTHER PUBLICATIONS

"UVSG Teams With Microsoft On Internet Information Server," press release of United Video Satellite Group (Feb. 22, 1996).

"UVSG Offers System–Specific Web Site Development for OPS," press release of United Video Satellite Group (Apr. 12, 1996).

"Set–Top Box Control Software: A Key Component in Digital Video," in *Philips Journal Of Research,* Rath et al. (1996).

* cited by examiner

UPN | PREVUE CHANNEL ONLINE | GO TO | TCI | STAR TREK... VOYAGER

| TIME | CHANNEL |
|------|---------|
| CATEGORY | SEARCH |

SELECT DAY TO VIEW
S M T W T F S
            1 2 3 4 5 6 7
8 9 10 11 12 13 14
15 16 17 18 19 20 21

SELECT TIME OF DAY
EARLY    MORNING
MID-DAY    AFTERNOON
PRIME TIME    LATE NITE

| TIME & DATE | 2 KCBS DESCRIPTION |
|---|---|
| 11:00AM | COLLEGE FOOTBALL:ARMY VS. NAVY (SNOWING) |
| 2:30PM | COLLEGE BASKTBALL KANSAS AT UCLA |
| 3:00PM | PAID PROGRAM |
| 3:30PM | PAID PROGRAM |
| 6:00PM | BEACH PATROL |
| 7:00PM | COAST GUARD |
| 7:30PM | CBS EVENING |
| 8:00PM | NEWS |
| 9:00PM | ENTERAINMENT TONIGHT |
| 10:00PM | DR. QUINN, MEDICINE WOMAN |
| 11:00PM | EARLY EDITION |
| SUN 08 | |
| 12:00AM | WALKER, TEXAS RANGER |

PROGRAM INFO

WHAT'S ON BY PREVUE INTERACTIVE....

| TIME & DATE | CHANNEL | LISTING FOR GENRE - MOVIE |
|---|---|---|
| SAT 07 12:00PM | 21 AMC | LAND OF THE PHARAOHS |
| SAT 07 12:00PM | 36 REQ | THE CRAFT |
| SAT 07 12:00PM | 96 TCM | IN THE GOOD OLD SUMMERTIME |
| SAT 07 12:00PM | 99 ENCORE | SEX AND THE SINGLE GIRL |
| SAT 07 12:25PM | 25 SHOW | MAD LOVE |
| SAT 07 12:30PM | 95 FLIX | MOTHER JUGS & SPEED |
| SAT 07 1:00PM | 98 SPICE | EROTIC PRINCESS |
| SAT 07 1:00PM | 35 REQ | THE BIRDCASE |

WHAT'S ON BY PREVUE INTERACTIVE

THERE'S ONLY ONE MATCH FOR MATCHLIGHT!

| TIME | CHANNEL |
|---|---|
| CATEGORY | SEARCH |

SELECT DAY TO VIEW
S M T W T F S
    1 2 3 4 5 6 7
8 9 10 11 12 13 14
15 16 17 18 19 20 21

SELECT TIME OF DAY
EARLY   MORNING
MID-DAY   AFTERNOON
PRIME TIME   LATE NITE

PROGRAM INFO

*FIG. 14*

INTERNET TELEVISION PROGRAM GUIDE SYSTEM WITH EMBEDDED REAL-TIME DATA

BACKGROUND OF THE INVENTION

This invention relates to the Internet, and more particularly, to techniques for providing television program guide information and services with embedded real-time data to a user over the Internet.

A large number of television channels are available over cable television systems and satellite television systems. Television viewers have traditionally had to consult pre-printed television program listings to determine which programs were scheduled to be broadcast on a particular day. More recently, television-based program guides have been developed that allow television viewers to view television program listings directly on their television sets.

For example, the Prevue® channel is a scrolling television program listings service that a cable system operator may make available to subscribers over a dedicated cable channel. Viewers can tune to the appropriate television channel to view program listings for television programs that are currently being broadcast and are scheduled to be broadcast in the next few hours. Although the Prevue® channel is a valuable service, the viewer is somewhat constrained by the passive nature of the service. For example, the viewer cannot view television listings for the next day or week.

As a result, more advanced television program guide services have been developed that allow a service provider to deliver television program listings data to a user's set-top box. The program listings data is typically delivered over the television cable system infrastructure (e.g., on a given television channel during the vertical blanking interval or over an out-of-band channel). Software in the set-top box allows the user to display the television program listings on the user's television set.

These program guide services allow the user to manipulate the television listings by searching or sorting through the listings using criteria such as genre, channel, and broadcast time. An example of such an interactive television program guide is the Prevue Express® guide of Prevue Networks, Inc. of Tulsa, Okla., the assignee of the present invention.

Although passive scrolling guides and interactive set-top box guides are useful sources of television program guide information, millions of users with personal computers were not able to obtain on-line television program listings using such systems. In addition, users were not generally able to view selected promotional video clips, interview segments, audio clips, or other multimedia material related to a given television program.

In order to meet these demands, television program guide systems that provide television program listings from a web server to a user's multimedia system over an Internet communication link were developed. For example, the Prevue Online® service available on the Internet at http://www.prevue.com from Prevue Networks, Inc. of Tulsa, Okla., the assignee of the present invention, provides television program listings over an Internet communication link. Users can gain access to the Prevue Online® web site on the Internet through any Internet service provider (such as through the WorldNet™ service available from American Telephone and Telegraph Company of New York, N.Y.). Once at the home page of the Prevue Online® service, the user may access information using commonly available web browser software.

Although Internet television program guide systems that provide television program listings from a web server to a user's multimedia system over an Internet communications link are useful sources of television program guide information, the user is somewhat constrained by the static nature of the information available. The user is able to determine from the television program listings that an event (e.g., a sporting event or other game) is in progress, but the user cannot view the current status of the event. For example, the user cannot receive real-time information about whether a game is suspended, whether the game is in overtime, the current score, etc.

It is therefore an object of the present invention to provide a television program guide system that provides television program listings with embedded real-time data from a web server to a user's multimedia system over an Internet communications link.

It is a further object of the present invention to provide a television program guide system that allows users to click on text or still images to view additional information related to the embedded real-time data.

SUMMARY OF THE INVENTION

These and other objects of the invention are accomplished in accordance with the principles of the present invention by providing an Internet television program guide system, that displays television program listings with embedded real-time data. A computer system having a media library and a data server is used to provide multimedia clips and related television program guide data for the system. The multimedia material and related television program guide data may be provided to a web server for redistribution to a user's personal computer or other suitable multimedia system.

Dynamic information regarding events in progress that are being televised may be provided to the web server from one or more information processing facilities. Such dynamic information may be linked with related static information in the media library and/or the data server to provide the user with additional information pertaining to the events in progress. The web server provides the static and dynamic information to the user's multimedia system via an Internet communications link.

The user's multimedia system has a processing unit for receiving and processing information from the Internet communications link. The processing unit may be based on a personal computer running a standard web browser with plug-ins. The multimedia system may also have the capability to receive television signals.

Television program listings with embedded real-time data are preferably provided to the user's multimedia system in the form of web pages. Because such an arrangement allows the use of the widely-adopted hypertext transfer protocol (http), a user with a personal computer can access information using commonly available web browser software. Because television program listings with embedded real-time data are distributed over the Internet, the user can access this information at remote locations. For example, the user can access the television program listings with embedded real-time data while traveling by car (e.g., using a cellular modem), from a hotel room or business meeting, from a personal computer at work, or in any suitable environment in which there is a link to the Internet. The user can receive this dynamic information from locations not covered by cable or satellite systems or locations where the user may not have access to cable or satellite service.

Because the Internet television program guide system with embedded real-time data may be provided using a web site having a number of linked web pages, supplemental information related to the embedded real-time data can be provided to the user. Such supplemental information might include statistics pertaining to the teams and/or specific athletes that are participating in a game. The supplemental information may be provided using any suitable media format such as animation, full motion video, sound, still images, or text.

Further features of the invention, its nature and various advantages will be more apparent from the accompanying drawings and the following detailed description of the preferred embodiments.

BRIEF DESCRIPTION OF THE DRAWINGS

FIG. 11 is an illustrative display presenting a menu of channel selections in accordance with the present invention.

FIG. 12 is an illustrative display containing television program guide listings organized by channel in accordance with the present invention.

FIG. 14 is an illustrative display containing television program guide listings organized by category in accordance with the present invention.

DETAILED DESCRIPTION OF THE PREFERRED EMBODIMENTS

Figure 1:
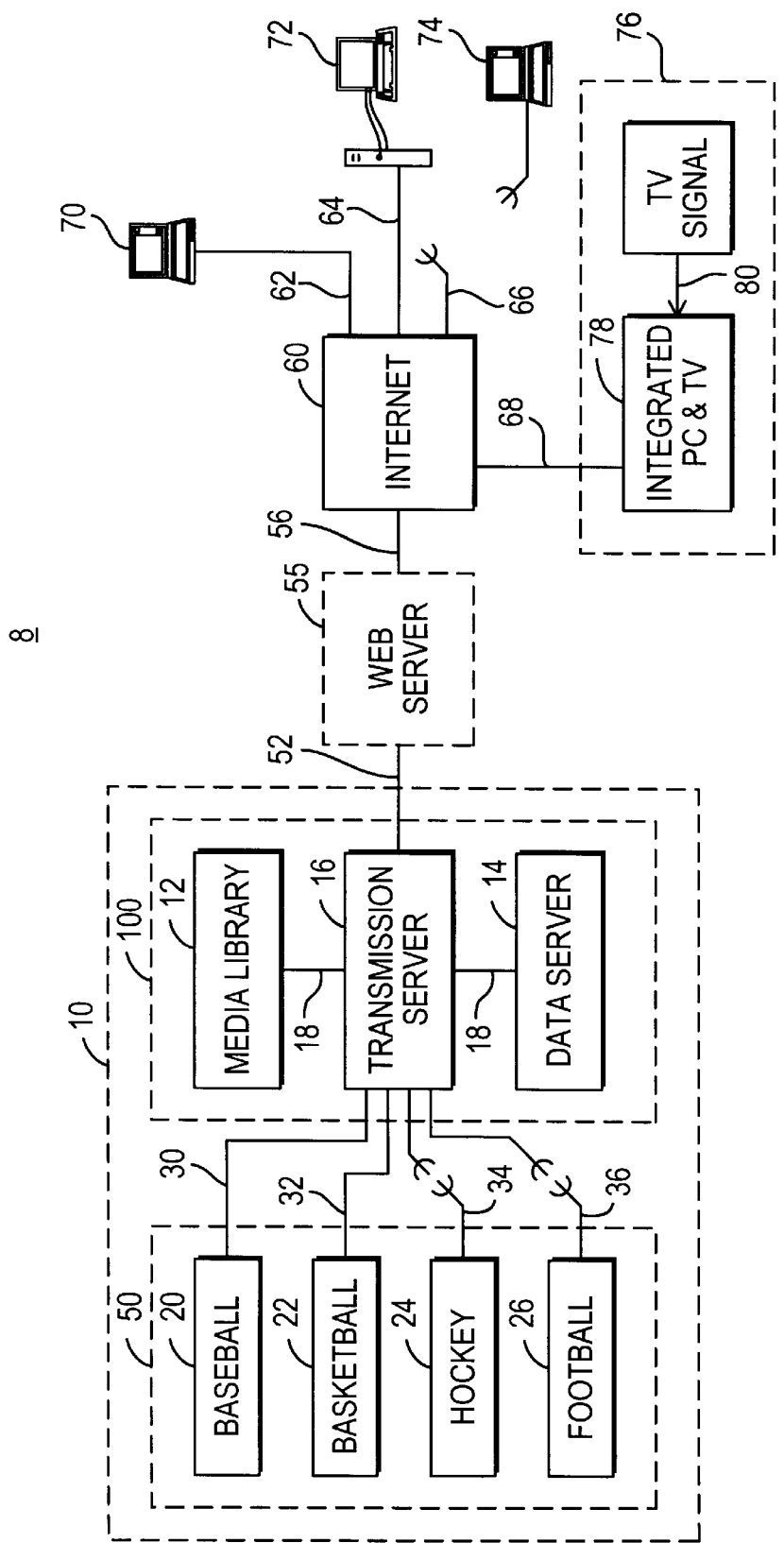
FIG. 1 is a schematic diagram showing how a media library, data server, and data inputs from information processing facilities may be interconnected with a web server and various multimedia systems in accordance with the present invention.

An Internet television program guide system 8 for providing television program listings with embedded real-time data in accordance with the present invention is shown in FIG. 1. Television program information is stored in media library 12 and data server 14 of main facility 10. Media library 12 preferably contains an array of compact disc read only memory (CD-ROM) disks, digital video disks (DVDs), or other suitable media for storing multimedia content. Media library 12 contains television program clips and related interviews and reviews. Media library 12 may also contain video clips and related interviews and reviews from previously televised sporting events. The television program information stored in media library 12 is primarily video information.

Data server 14 maintains various databases of television program information. For example, data server 14 maintains a television program listings database. Data server 14 may also have a remote media database containing descriptions of the videos in media library 12. In addition, data server 14 may have a database containing statistical information on various sports teams (e.g., National Football League teams, National Hockey League teams, National Basketball Association teams, etc.), as well as information on the players of each team. Data server 14 may have a cable system operator database containing channel lineups, information on the time zone of the operator, weather data for the operator's region, data on the zip codes in the cable system operator's area, etc. Other databases may be supported by data server 14 if desired. The television program information in data server 14 is primarily in non-video formats.

Media library 12 and data server 14 may be interconnected with transmission server 16 via internal network 18. In addition to information received from media library 12 and data server 14, transmission server 16 receives information from one or more real-time data processing facilities 20, 22, 24 and 26 via network links 30 and 32 and/or via satellite links 34 and 36. Media library 12, data server 14, network 18, and transmission server 16 including its links make up computer system 100. Television program information may be stored on data server 14 in a relational database format and may be stored on transmission server 16 in an object-oriented database format. A building process implemented in the C$^{++}$ programming language can be used to periodically build a temporary data set of television program information (e.g., a seven-day to one-month data set) for storage on transmission server 16.

Transmission server 16 receives dynamic or real-time data to be displayed with a corresponding program listing for an event in progress that is being televised or with any other program listing to which the real-time data is of relevance. Such real-time data may include weather data, sports scores, video stills, video and audio clips, interview segments, etc. The real-time data received by transmission server 16 from processing facilities 50 is embedded within the television program listing of the corresponding televised event in progress or within any other program listing to which the real-time data is of relevance. For example, if transmission server 16 receives real-time data from information processing facility 22 such as the score in a basketball game being played between the New York Knicks and the Chicago Bulls that is being televised on the MSG channel, the current score of the game is embedded within the row of text of the corresponding television program listing which indicates that the New York Knicks v. Chicago Bulls game is being televised on MSG from 8:00 P.M. EST to 11:30 P.M. EST. Similarly, real-time data pertaining to the weather may be embedded within the program listing of an outdoor event such as a marathon, which may be in progress and being televised or which may be scheduled to be televised in the near future.

Television program information including television program listings information and related real-time data may be transferred from transmission server 16 to web server 55 via communications line 52. Communications line 52 may be part of an internal network or may be a standard dedicated communications line. Data may also be transferred from transmission server 16 to web server 55 via satellite. Web server 55 can be connected to the Internet 60 via communications link 56. Communications link 56 is preferably a telephone network link or other suitable Internet communications path.

If transmission server 16 and web server 55 are separate devices, as shown in FIG. 1, transmission server 16 can be used as a common data processing facility for other applications which use the type of data stored on transmission server 16. If desired, the functions of transmission server 16 and web server 55 can be integrated in a single machine. Similarly data server 14 and transmission server 16 can be integrated in a single machine with separate logical functionalities.

Web server 55 uses a standard protocol such as the TCP/IP (Transmission Control Protocol/Internet Protocol) and hypertext transfer protocol to make television program information available over the Internet 60 to users at multimedia systems 70, 72, 74, and 76 via communication links 62, 64, 66, and 68, respectively. Communication links 62, 64, 66, and 68 are Internet links formed from telephone lines, radio-frequency (RF) links, cable modem links, satellite dish links, combinations of links such as these, or any other suitable Internet connection paths.

Multimedia systems 70, 72, and 74 may be standard modern laptops, notebooks, or desktop computers with multimedia and Internet capabilities. Multimedia system 76 uses an integrated personal computer and television 78, such as the Gateway 2000 Destination® PC-TV hybrid available from Gateway 2000 Inc. of North Sioux City, S. Dak. Television signals are provided at input 80. Internet access is provided via Internet communications link 68.

During operation of system 100, certain data processing functions, such as user-initiated searches and sorts, may be performed on web server 55. If desired, such functions can be performed on a suitable data processing component in one of multimedia systems 70, 72, 74, or 76.

Regardless of the specific configuration of the multimedia systems used in the system of FIG. 1, the user of such a multimedia system has the capability to access an interactive Internet television program guide having embedded real-time data within its program listings using web server 55. The features of the program guide are available using the personal computer functions of the user's multimedia system. If it is desired to use certain program guide features that rely upon the control of a tuner or recording unit, the multimedia system should also have the ability to tune to a desired television program from among the various television programs provided at input 80 and have the ability to record that program automatically, under the control of commands from a built-in processing unit.

The system hardware shown in FIG. 1 is illustrative and other suitable hardware arrangements may be used if desired. Regardless of the particular hardware system that is used, however, the present invention preferably provides the television program guide to users over the Internet in the form of multiple web pages that use the standard hypertext transfer protocol (http). In the system of FIG. 1, web pages and associated program guide features (such as searching, etc.) are provided using web server 55.

Because the television program guide is provided using web pages, the features of the program guide may be accessed using standard web browsers operating on the appropriate processing unit in the user's multimedia system. For example, in multimedia system 72 of FIG. 1, a web browser may be implemented using the computer's built-in processing unit. Suitable web browsers include the Internet Explorer® web browser of Microsoft Corporation of Redmond, Wash. and the Netscape Navigator® web browser of Netscape Communications Corporation of Mountain View, Calif. Such web browsers support the viewing of various types of multimedia content, such as video stills (JPEG or GIF files) and video and audio clips (AVI, MOV, and MPG files). If desired, certain of these multimedia support functions may be provided as web browser plug-ins (i.e., special software modules designed to enhance the features of a web browser application). A suitable video player plug-in for MOV files is the Quicktime® application of Apple Computer, Inc. of Cupertino, Calif. AVI and MPG (or MPEG—Motion Picture Expert Group) files may be played using the ActiveMovie® application of Microsoft Corporation.

Figure 2:
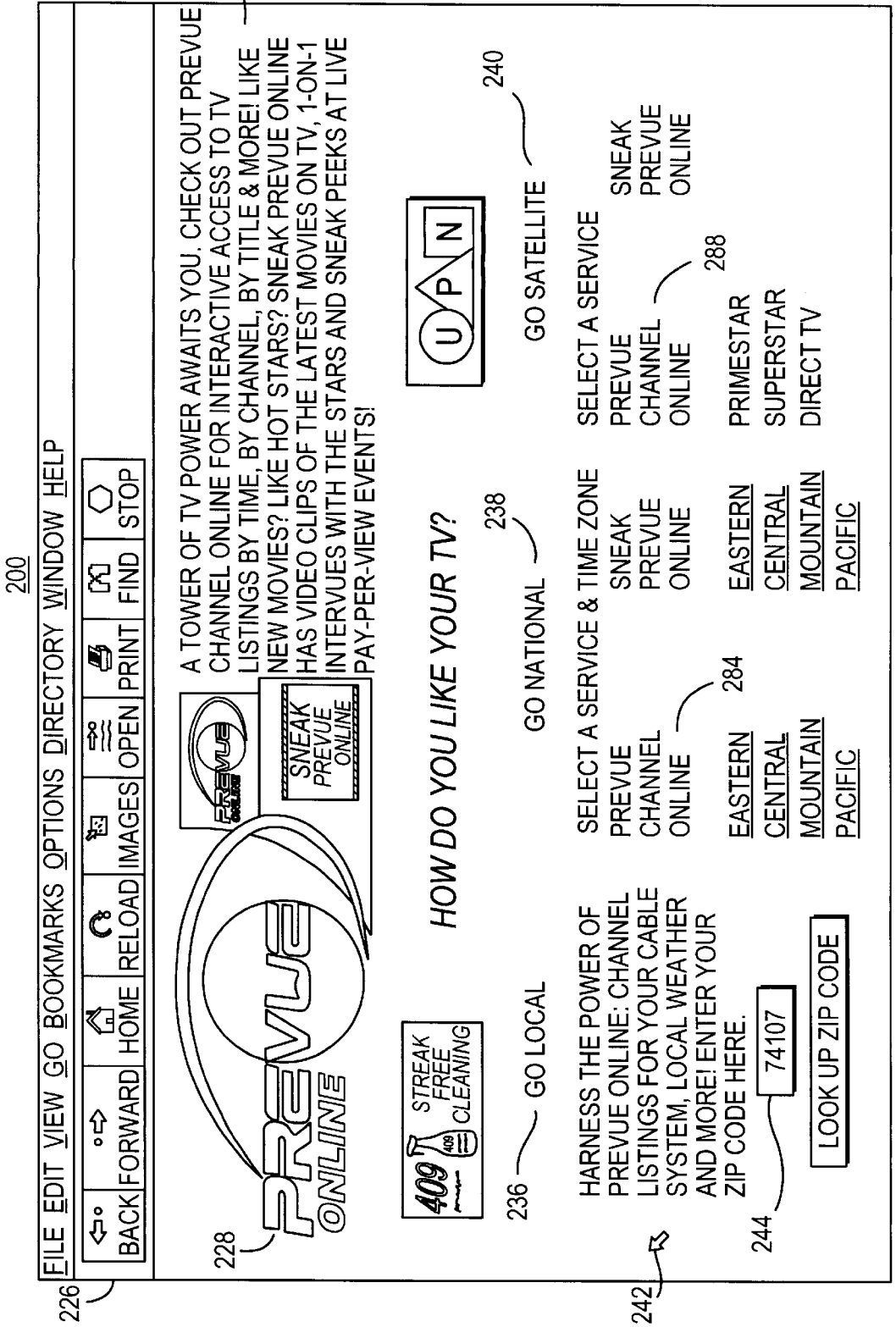
FIG. 2 is an illustrative display containing a home page for an Internet television program guide system with embedded real-time data in accordance with the present invention.

An illustrative welcome page 200 for the television program guide of the present invention is shown in FIG. 2. Web browser function keys 226 help the user to navigate through web pages of material such as welcome page 200. Users may also navigate by clicking on an image or an element of highlighted text with cursor 242, which may be controlled by a pointing device such as a mouse or trackball. Other arrangements for selecting links may be used if desired. Web browser function keys 226 include back and forward keys that allow the user to navigate backward and forward along a browsing trail. Web browser function keys 226 are not shown in the other drawings, but are shown in FIG. 2 to illustrate the types of function keys that are available with a standard web browser.

Welcome page 200 may contain identifying logos 228. Identifying logos 228 allow a user to quickly associate a service provider with the Internet television program guide service. If desired, welcome page 200 can contain summary instructions 230 that inform the user of some of the features available with the guide. The summary instructions 230 may, for example, inform the user that the guide provides embedded real-time data within the program listings of televised events in progress. Other web pages (not shown) may contain links that point to welcome page 200.

An important aspect of the Internet television program guide provided by system 8 (FIG. 1) relates to providing on-line television program listings that contain real-time data on televised events in progress. The user may be presented with a number of choices regarding the type of on-line program listings that are available. In addition, the user may be provided with an opportunity to access supplemental real-time information on the events in progress based on the program listings the user displays. For example, the user may be presented with the opportunity to select between go local option 236, go national option 238, and go satellite option 240. After the user has selected one of these options, the user may access dynamic information pertaining to events in progress which are being televised and thus appear in the program listings for the option chosen by the user.

Figure 3:
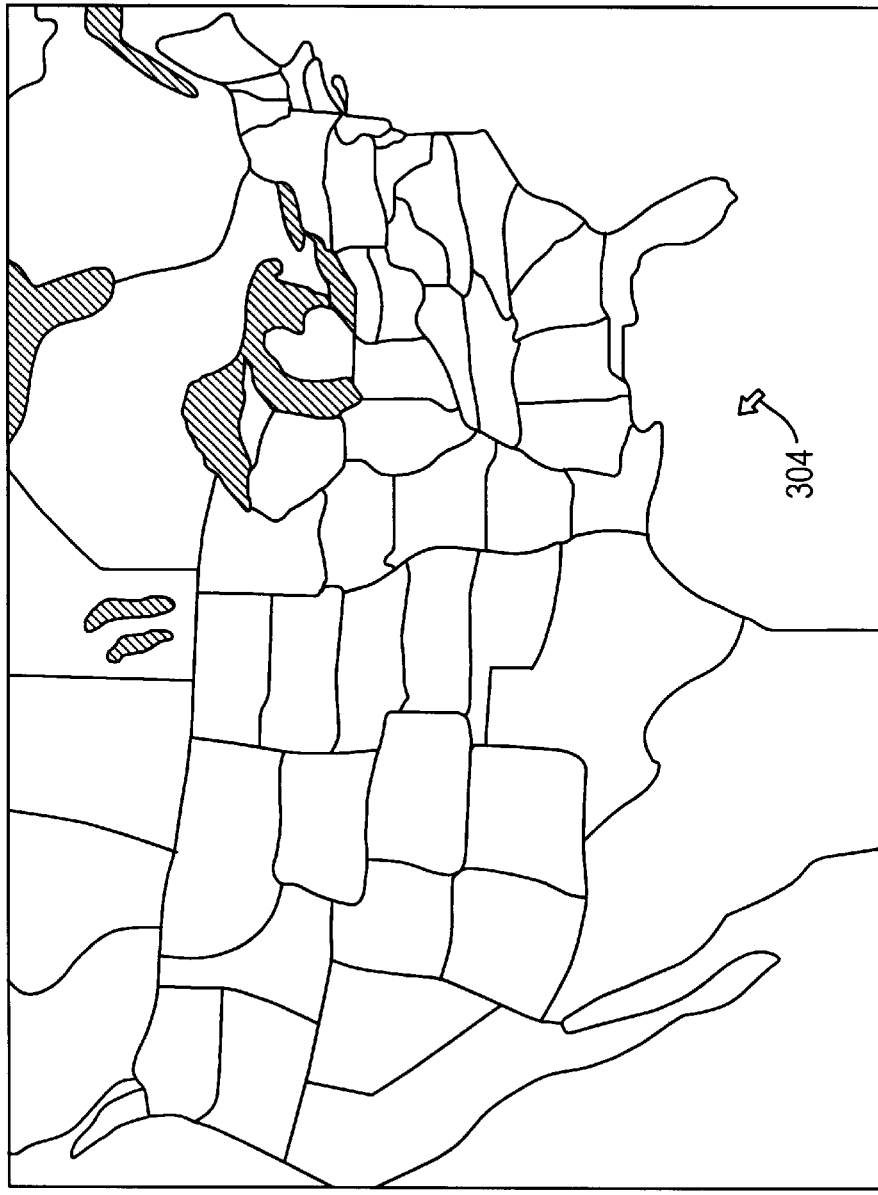
FIG. 3 is an illustrative display containing a map-based menu for identifying a geographical area of interest in accordance with the present invention.

If the user desires to select go local option 236, the user may be prompted to enter a zip code for the local area of interest in box 244. If service is available, the program guide system presents the user with information for an appropriate local system operator's television lineup based on the zip code information. If the user is unaware of the zip code of the region where the event in progress is being televised, the user can select a local area by entering information such as a cable system operator's name, the name of a city, international country and city information, etc. Another way in which the user may select a local service area of interest is using a map-based graphical user interface. As shown in FIG. 3, the user is presented with United States map 302. The user selects a state of interest using cursor 304. If necessary, additional maps containing greater levels of detail are provided, each allowing the user to make further geographical selections. Ultimately, the user is presented with a local map (e.g., a map that allows the user to select from several available cable system operators). In map 306 of FIG. 4, the user can select between three available cable system operator regions: region 1, region 2, and region 3.

Figure 5:
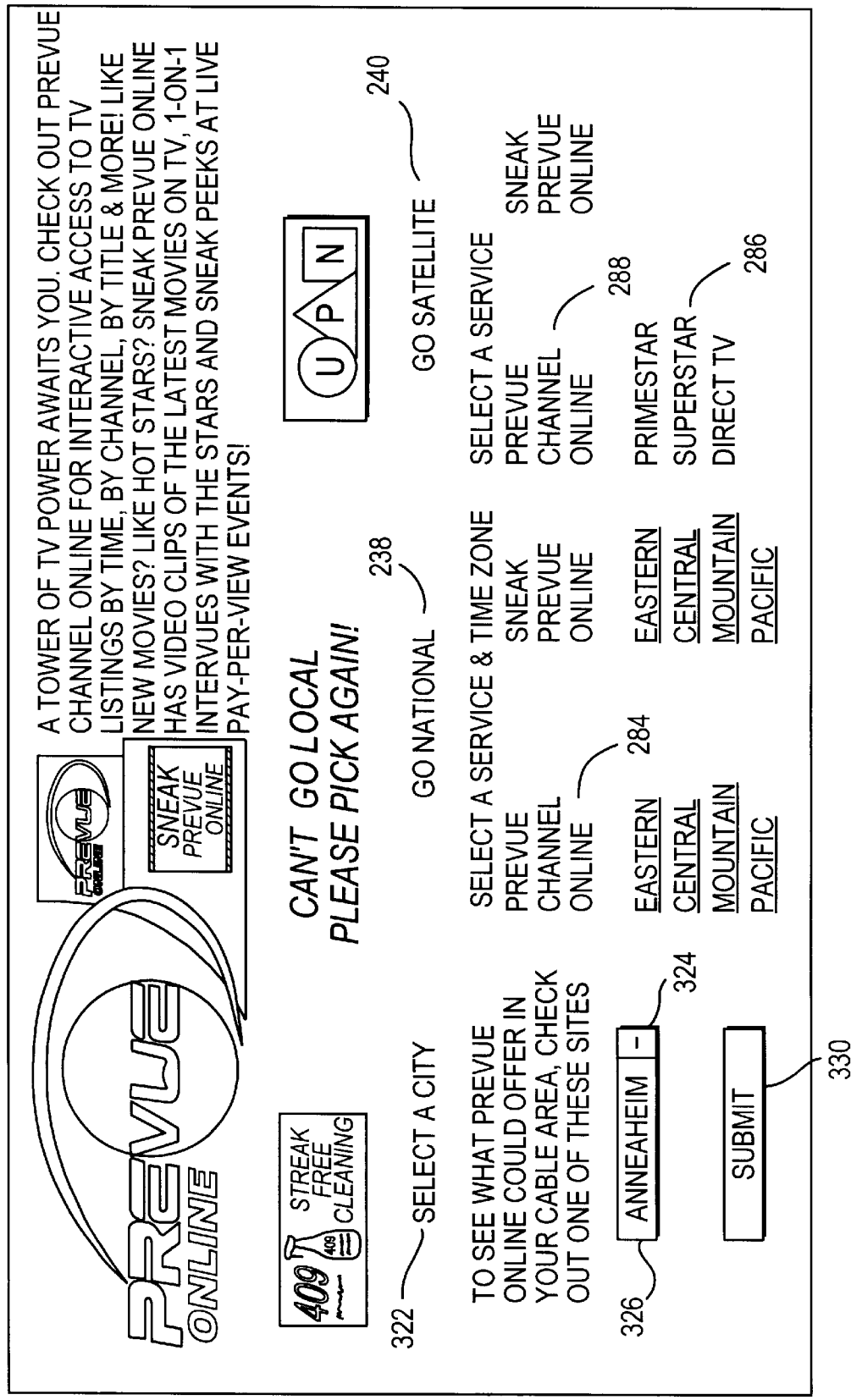
FIG. 5 is an illustrative display of a menu offering access to various types of program listings as alternatives to access to local program listings in accordance with the present invention.

If no local service is available, the user may be provided with pick again page 320 as shown in FIG. 5. Pick again page 320 provides the user with another opportunity to select go national option 238 or go satellite option 240. In addition, pick again page 320 provides the user with select a city option 322, which is associated with a less restrictive set of program information than go local option 236 (FIG. 2). With select a city option 322, the user may select a desired city where the event in progress is being televised using arrow key 324 (or alternatively, could type the name of the city directly into box 326). After entering the desired city, the city information is submitted to the system by clicking on submit button 330. Because select a city option 322 is less localized than go local option 236, choosing select a city option 322 makes it more likely that there will be a set of program listings available for the user.

Figure 6:
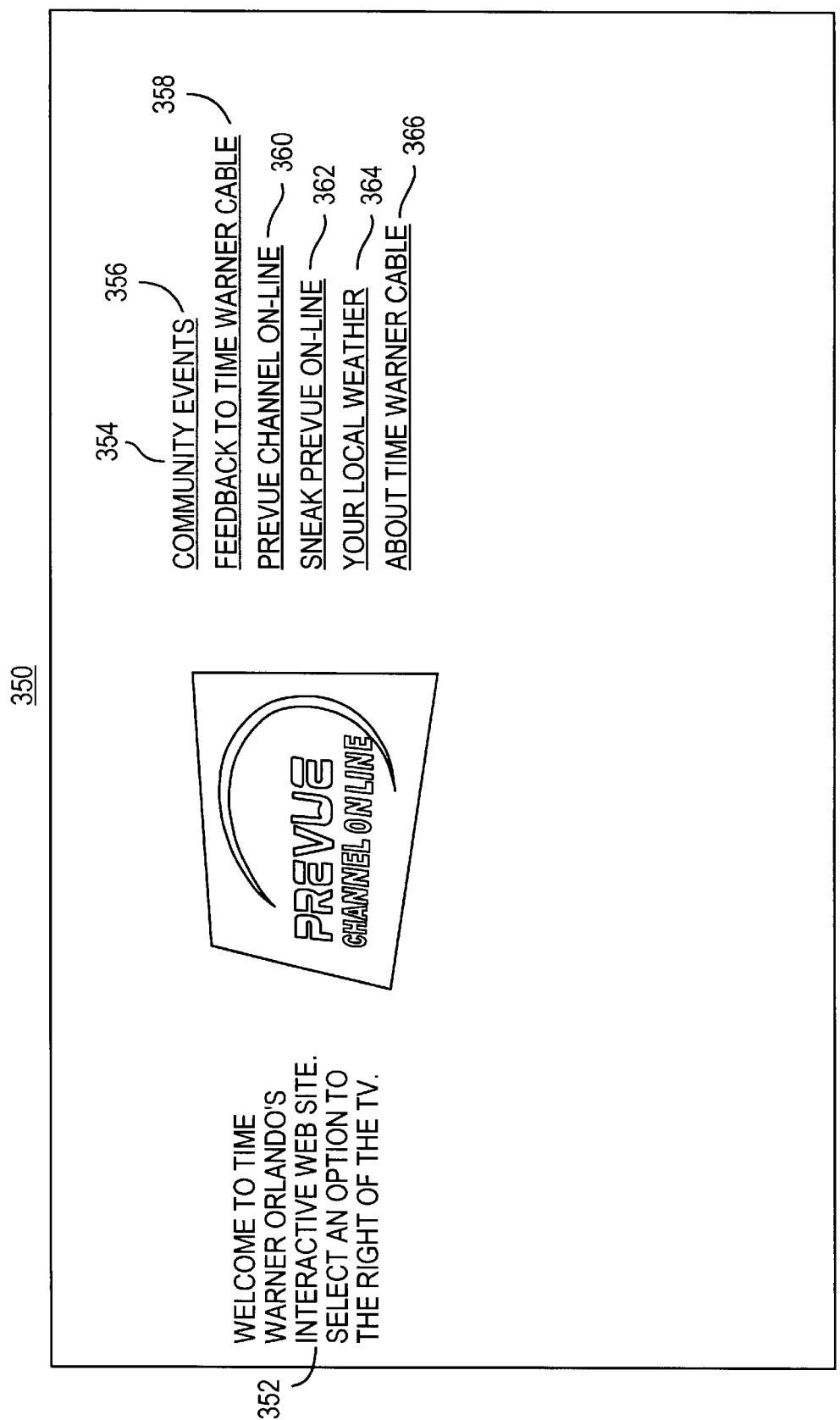
FIG. 6 is an illustrative display presenting various program guide options to the user in accordance with the present invention.

If service is available for the user in either the city selected in city option 322 or the localized geographic area selected in go local option 236, the user is presented with local cable site page 350 of FIG. 6, which is customized to reflect the local geographic area or city selected by the user. Local cable site page 350 may contain a welcome message 352 that is customized to reflect the name of the local cable system operator.

A number of options 354 may be presented as hypertext links to associated web pages. An image 356 is displayed that changes as the user places cursor 242 (FIG. 2) on top of each option 354. For example, the image 356 of FIG. 6 is presented when the user positions cursor 242 over program guide option 360. Different images are displayed as cursor 242 passes over each option 354. The images 356 to be displayed may be stored as bitmap images. This technique of presenting context-sensitive images to illustrate the current position of the cursor over hypertext link options is preferably used throughout the Internet television program guide service.

Figure 4:
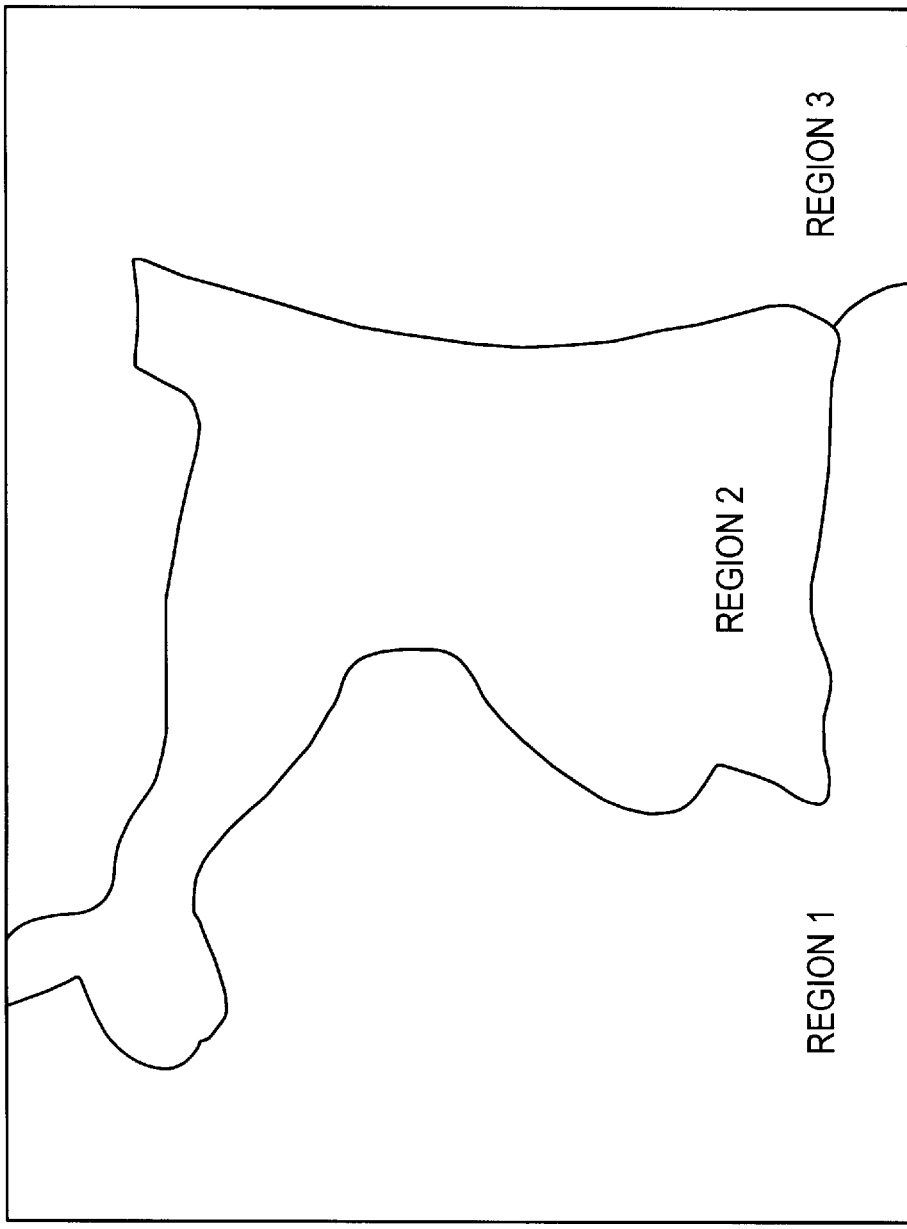
FIG. 4 is an illustrative display containing a map-based menu for a smaller geographical area than the area shown in FIG. 3.
Figure 7:
FIG. 7 is an illustrative display containing weather information.

Various web pages may be displayed depending on which option 354 is selected by the user. For example, an option 354 that is available on local cable site page 350 (FIG. 6) is local weather option 364. Selecting local weather option 364 takes the user to local weather page 400 (FIG. 7). If desired, a map-based menu (such as shown in FIGS. 3 and 4) or other user input arrangement can be used to provide the user with the opportunity to select additional cities for which weather information is desired.

Figure 8:
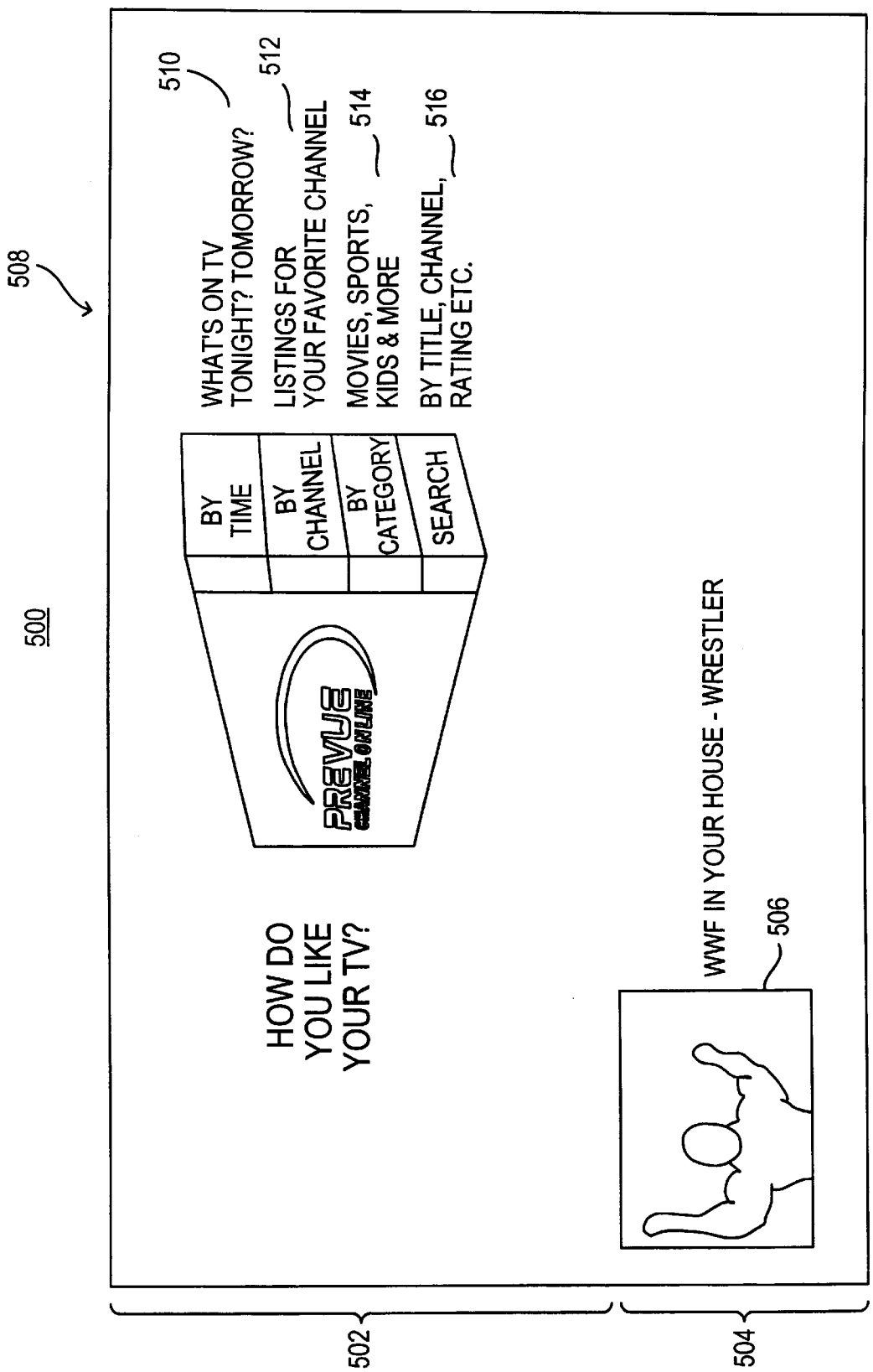
FIG. 8 is an illustrative display presenting various program guide options related to the way in which television program guide listings are organized on the user's display screen in accordance with the present invention.

Program guide option 360 allows the user to access television program listings that can be organized by time, channel, and category and can be searched. Selecting program guide option 360 takes the user to program guide menu page 500 (FIG. 8). The user may reach program guide menu page 500 (FIG. 8) from go national option 238 (FIGS. 2 and 5) or go satellite option 240 (FIGS. 2 and 5). If the user selected go local option 236 (FIG. 2), the user may reach program guide menu page 500 (FIG. 8) by selecting program guide option 360 on local cable site page 350 (FIG. 6). The user may also reach program guide menu page 500 (FIG. 8) via select a city option 322 (FIG. 5). Each of these paths to program guide menu page 500 requires that slightly different user selections be made.

Go local option 236 (FIG. 2) requires that a user specify a particular local region (or cable system operator) of interest to reach local cable site page 350 (FIG. 6). To reach program guide menu page 500 (FIG. 8) from local cable site page 350 (FIG. 6), the user selects program guide option 360.

Go national option 238 (FIGS. 2 and 5) requires that a user select a desired time zone (e.g., eastern, central, mountain, or pacific). To reach program guide menu page 500 from welcome page 200 (FIG. 2) or pick again page 320 (FIG. 5), the user selects program guide option 284.

Go satellite option 240 (FIGS. 2 and 5) requires that the user select a desired satellite provider 286. To reach program guide menu page 500 from welcome page 200 (FIG. 2) or pick again page 320 (FIG. 5), the user selects program guide option 288.

Select a city option 322 (FIG. 5) requires that the user enter information specifying a particular city. The user reaches program guide menu page 500 from local cable site page 350 (FIG. 6) after the user submits the city information by clicking on submit button 330.

Regardless of which option is used to reach program guide menu page 500 (FIG. 8), information is preferably retained by the system that indicates which selections have been made by the user. Retaining this information allows subsequently displayed program listings and other information to be automatically customized to reflect the user's selections.

As shown in FIG. 8, program guide menu page 500 may be constructed from two smaller web pages: top web page 502 and a bottom web page 504. Top web page 502 contains graphics and text-based options 508 that are common to many different system operators. Bottom web page 504 may contain system specific promotional materials, such as pay-per-view video promotion 506. Dividing program guide menu page 500 in this way allows system resources to be used more efficiently than would otherwise be possible, because the common material in top web page 502 can be used for more than one local cable system.

Options 508 allow the user to choose how to display various program listings for the user's preselected region of interest (national, satellite, or local). Typical options 508 include by time option 510, by channel option 512, by category option 514, and search option 516. The user may, based upon category options 514, locate an event by choosing the corresponding category. If the event sought by the user is a game in progress which is being televised, then the user may select sports as the category by which program listings are to be displayed. The user may thus be able to locate the sporting event of interest along with its real-time embedded data and any associated supplemental information.

Figure 9:
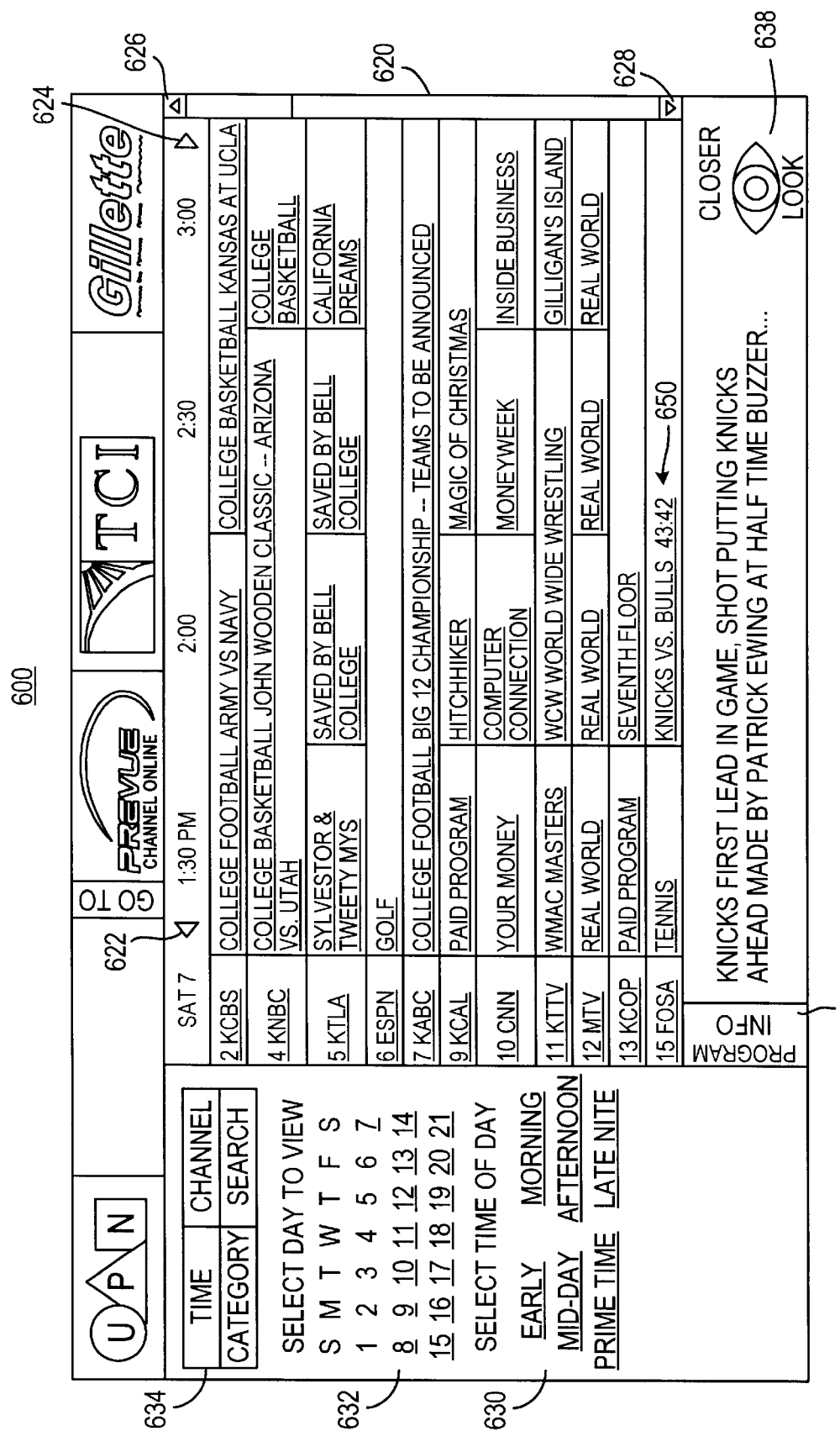
FIG. 9 is an illustrative display containing television program guide listings organized by time in accordance with the present invention.

If by time option 510 is selected, the user is presented with by time page 600, as shown in FIG. 9. By time page 600 contains program listings 620 that are organized in channel order from top to bottom and by broadcast time from left to right. In by time page 600, the programs in program listings 620 may be listed beginning with programs that are currently being broadcast. For example, if the current time is between 1:30 P.M. and 2:00 P.M., program listings 620 may begin with programs that start at 1:30 P.M. Programs in program listings 620 that are reflective of televised events in progress provide dynamic information about those events by way of embedded real-time data 650. Embedded real-time data 650 may be displayed adjacent to a program title, as shown in FIG. 9. Program listings 620 can be identified as events in progress by stating that the broadcast is "LIVE" and/or by distinguishing the appearance of live program listings from those that are prerecorded by virtue of color, text, etc.

If the user is aware that a televised event is in progress, the user may use by time option 510 or other suitable display option to display the desired program listing. The user can visually locate the program listing of interest and the corresponding real-time data within the listing because of its distinguishing appearance.

The user can also select the search option 516 and can search for program listings by title, channel, rating, etc. The user may search for televised sporting events in progress by selecting a channel dedicated to sports. Similarly, if the user knows the title of a sporting event and wishes to view the current score or other information in real time, the event and its corresponding embedded real-time data can be located by conducting a search by title.

Cursors 622 and 624 (FIG. 9) are used to navigate to earlier or later time periods, respectively. Web browser cursors 626 and 628 allow the user to scroll through the program listings. The user may also navigate the program listings with time navigation buttons 630. For example, if the user would like to view program listings that begin in the morning, the user clicks on the morning navigation button 630. If the user would like to view program listings for programs currently being broadcast, the user may click on the current navigation button 630. Program listings for different days in the month may be viewed by selecting the appropriate day from calendar buttons 632. Similarly, information regarding events televised live in the past can be viewed by the user by selecting the day of the event from the calendar. The program listing displayed in that event would reflect the final score, if the event was a game, in addition to other information that was made available to the user at the time the event was being televised.

Figure 11:
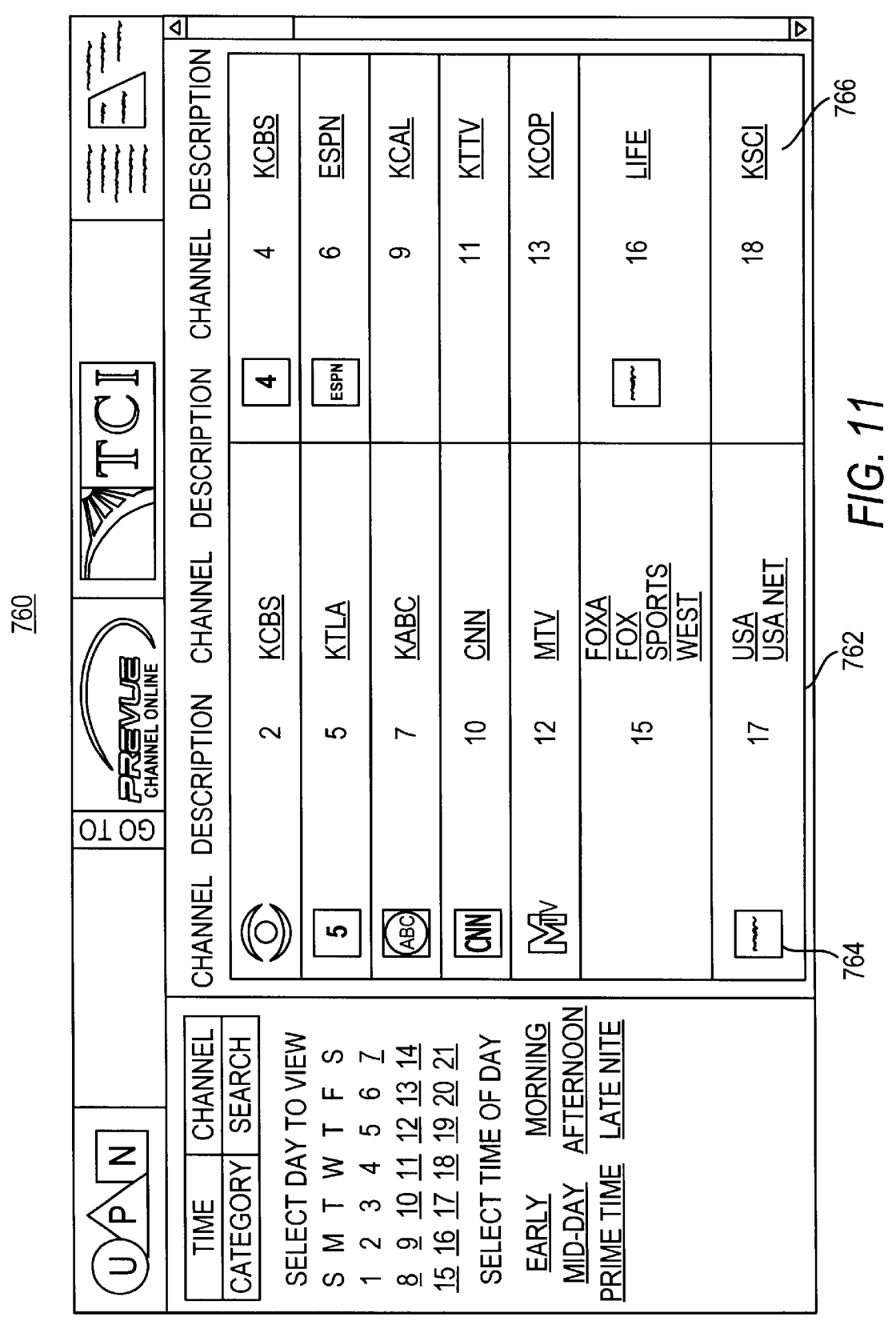

The user can choose between various available view options by selecting the appropriate time, channel, category, or search button from among view buttons 634. View buttons 634 take the user to the same web pages that are presented when the corresponding options 508 of FIG. 8 are selected. For example, by channel option 512 and channel view button 634 are both linked to by channel page 760 (FIG. 11).

Another component of by time page 600 and various other web pages provided by the present system is program information box 636. Program information box 636 provides supplemental information on the selected television program listing. The contents of program information box 636 change as different program titles are selected from program listings 620. For example, the user has clicked on the entry "Knicks v. Bulls" in program listings 620 of FIG. 9. As a result, the contents of program information box 636 reflects this selection. If the program title selected by the user corresponds to an event in progress which is being televised (e.g., a basketball game), then program information box 636 may reflect static as well as dynamic information about the event.

In the above example, program information box 636 might contain static information such as the program title (e.g., Knicks v. Bulls) or the running time of the program (e.g., 2:45). Program information box 636 might also contain real-time data such as the current score (e.g., Knicks: 43; Bulls: 42, half time . . . ), highlights of the game (e.g., Knicks first lead in the game, shot putting Knicks ahead made by Patrick Ewing at half time buzzer . . . ). Program information box 636 may be customized to reflect additional information in a different sequence as well.

If the user selects a program that is not a televised event in progress, the program information box 636 provides solely static information pertaining to the selection made by the user. For example, if the user selects a movie, then the program information box 636 typically contains the program title (e.g., Primal Fear), the running time of the program (e.g., 2:09), a brief description of the program (e.g., A hot shot . . . ), and a description of the program type or genre (e.g., drama movie). The program description may contain information on the actors in the program, the director, etc. Program information box 636 typically provides a rating of the program, such as a star rating (e.g., three stars) or the Motion Picture Association of America (MPAA) rating for movies or the television rating for television programs.

Figure 10:
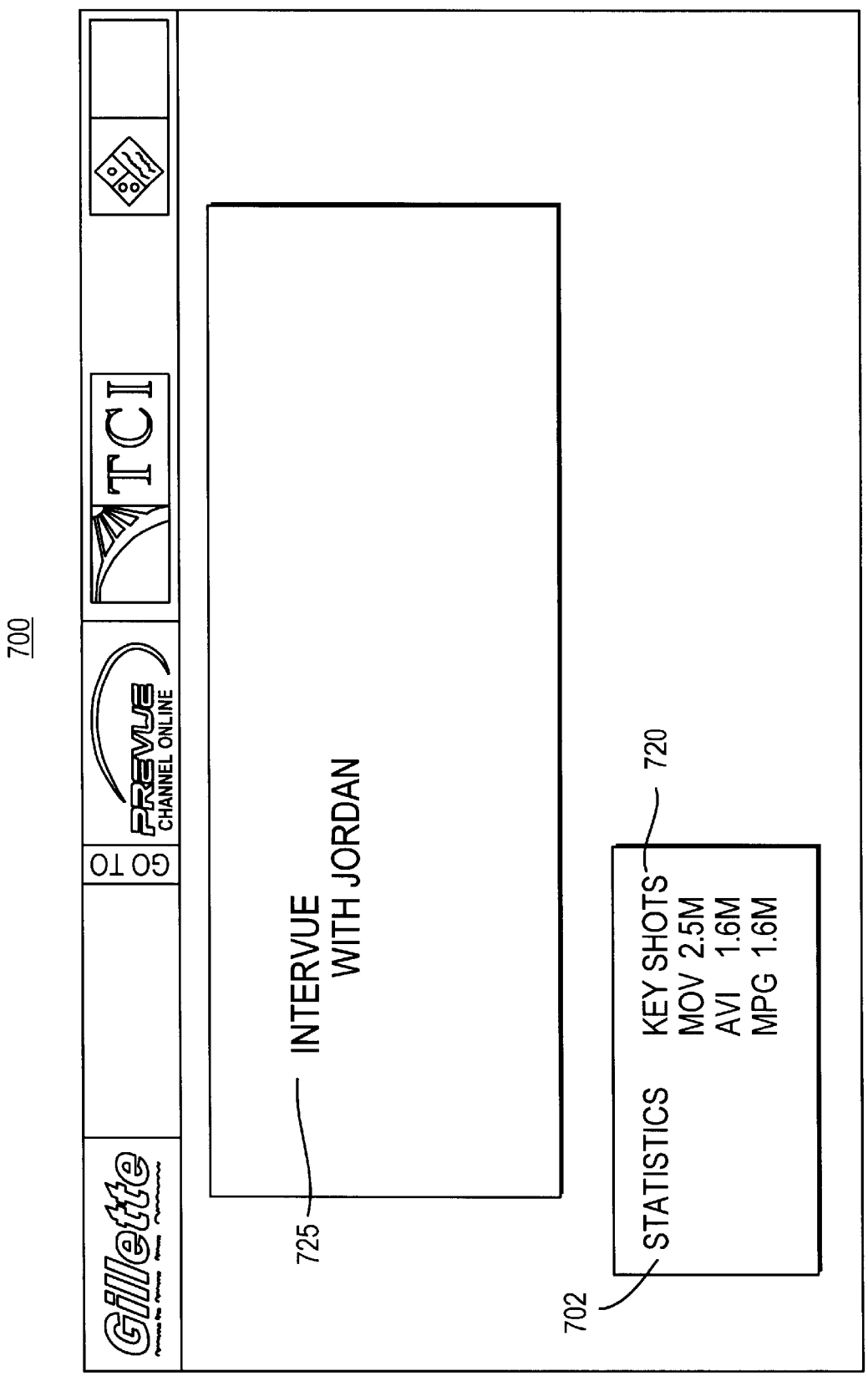
FIG. 10 is an illustrative display of information on an event selected by the user and related options in accordance with the present invention.

If the user desires to view additional supplemental information relating to the selected program, the user may click on closer look icon 638 (or alternatively, on any portion of box 636), which takes the user to program information page 700 (FIG. 10). Program information page 700 may provide both static and dynamic information relating to the selected program listing. If the program listing selected by the user is for a televised game in progress, the information displayed on program information page 700 could reflect the statistics 702 of the teams and/or individuals that are playing. In addition, additional information could also include video stills, video and/or audio clips of key shots made or missed by players 720, interview segments 725, etc. A user can also click on a graphic or text link to the web site of a network or other source of information.

By channel page 760 of FIG. 11 is presented when the user selects by channel option 512 from program guide menu page 500 (FIG. 8) or when the user clicks on a channel view button, such as channel view button 634 of by time page 600 (FIG. 9). By channel page 760 contains channel list 762. Channel list 762 may be arranged in channel number order and may contain associated icons 764 for certain channels. A user can click on each individual channel 766 in channel list 762 to obtain a list of program information based on the selected channel. For example, the user may select a sports channel to view dynamic information pertaining to a game in progress being televised on that particular channel.

When a channel 766 is selected, the user is presented with channel program list page 800, as shown in FIG. 12. The selected channel in the example of FIG. 12 is channel 2. In channel program list page 800, program listings 802 for the selected channel may be arranged in time order, beginning with the current time. If programs in program listings 802 extend into the next day, the programs may be separated by date separation bar 804. Embedded real-time data may appear with the program name in program listings 802, as real-time weather data 807 appears next to the title "College Football Army vs. Navy" in FIG. 12. Title bar 806 contains information identifying the currently selected channel.

Figure 13:
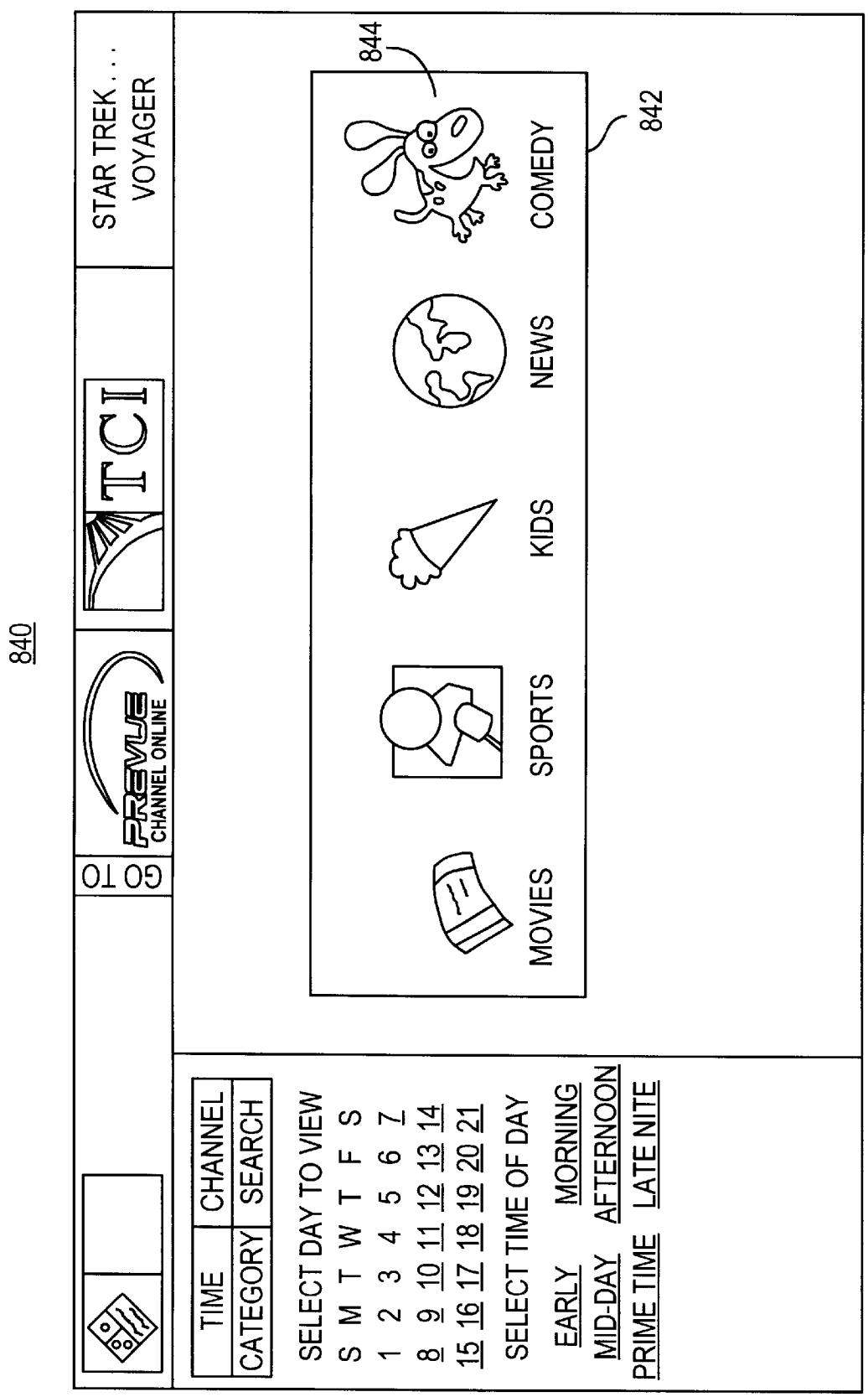
FIG. 13 is an illustrative display containing icons representing category options in accordance with the present invention.

By category page 840 of FIG. 13 is presented when the user selects by category option 514 from program guide menu page 500 (FIG. 8) or when the user clicks on a category view button, such as category view button 634 of by time page 600 (FIG. 9). By category page 840 contains category list 842, which may be presented in the form of category icons 844. A user can click an individual category icon 844 in category list 842 to obtain a list of program information based on the selected category. For example, the user may choose sports as a category to view a list of sports programs.

When a category is selected, the user is presented with category program list page 860, as shown in FIG. 14. In category program list page 860, program listings 862 may be arranged in time and channel order, beginning with the current time and date. Although the category program list page 860 depicted in FIG. 14 is based upon the selection of the movies category, a similarly arranged sports category program list would have been displayed had the user selected the sports category. Moreover, if the sports event was then in progress and being televised, embedded real-time data would appear with the program name in program listings 862. Program listings 862 contain the channel information for each program adjacent to the program title. If a user wishes to view program information for a given channel, the user may click on one of the displayed channels. The user is then presented with a program list that is restricted to programs appearing on the selected channel.

If desired, the program list that is displayed in category program list page 860 may be limited to programs appearing in the next 24 hour period. The user may view information for later days by clicking on the appropriate day in calendar buttons 866.

The foregoing is merely illustrative of the principles of this invention and various modifications can be made by those skilled in the art without departing from the scope and spirit of the invention.

What is claimed is:

1. An Internet television program guide system for providing television program listings with embedded real-time data to a user at a multimedia system over an Internet communications link, comprising:
    a computer system for providing television program listings with embedded real-time data, said real-time data corresponding to events being televised live; and
    a web server for receiving the television program listings with embedded real-time data from the computer system and for providing the television program listings with embedded real-time data corresponding to events being televised live to the multimedia system over the Internet communications link when the user accesses the television program listings with embedded real-time data using the multimedia system.

2. The system defined in claim 1 wherein the computer system comprises a media library containing video clips.

3. The system defined in claim 1 wherein the computer system comprises a data server on which at least part of the television program listings are stored.

4. The system defined in claim 1 wherein the computer system comprises means for receiving the real-time data from a real-time data processing facility.

5. The system defined in claim 4 wherein the real-time data processing facility supplies real-time sports scores.

6. The system defined in claim 4 wherein the real-time data processing facility supplies real-time weather data.

7. The system defined in claim 1 wherein the computer system comprises means for providing real-time data containing textual information.

8. The system defined in claim 1 wherein the computer system comprises means for providing real-time data containing video images.

9. The system defined in claim 1 wherein the computer system comprises means for providing real-time data containing video clips.

10. The system defined in claim 1 wherein the computer system comprises means for providing real-time data containing audio clips.

11. The system defined in claim 1 wherein the computer system comprises means for providing real-time data containing combinations of textual information, video clips, video images, and audio clips.

12. The system defined in claim 1 further comprising means for accessing the embedded real-time data by displaying corresponding television program listings.

13. The system defined in claim 1 further comprising means for providing a go national option which the user selects to receive real-time data embedded within national television program listings.

14. The system defined in claim 1 further comprising means for providing a go satellite option which the user selects to receive real-time data embedded within satellite television program listings.

15. The system defined in claim 1 further comprising means for providing a go local option which the user selects to receive real-time data embedded within local television program listings.

16. The system defined in claim 15 further comprising means for selecting a locality for the local television program listings.

17. The system defined in claim 16 wherein the means for selecting a locality comprises means for accepting a zip code from which the locality is determined.

18. The system defined in claim 16 wherein the means for selecting a locality comprises means for selecting a local region from a map.

19. The system defined in claim 15 further comprising means for presenting a pick again web page when television program listings are not available for the selected locality.

20. The system defined in claim 1 further comprising:
    means for providing a program guide option; and
    means for presenting a program guide menu web page when the user selects the program guide option.

21. The system defined in claim 1 further comprising means for providing a selectable option to arrange the television program listings by time.

22. The system defined in claim 1 further comprising means for providing a selectable option to arrange the television program listings by channel.

23. The system defined in claim 1 further comprising means for providing a selectable option to arrange the television program listings by category.

24. The system defined in claim 23 wherein one of the categories is sports.

25. The system defined in claim 1 further comprising means for searching the television program listings.

26. The system defined in claim 25 further comprising means for searching the television program listings by title.

27. The system defined in claim 25 further comprising means for searching the television program listings by category.

28. The system defined in claim 1 further comprising means for allowing a user to select a given one of the television program listings with embedded real-time data.

29. The system defined in claim 28 further comprising means for providing supplemental information on the selected television program listing with embedded real-time data.

30. The system defined in claim 29 wherein the supplemental information is real-time information on same display screen.

31. The system defined in claim 29 wherein the supplemental information is real-time and non-real-time information on a web page.

32. The system defined in claim 1 wherein the computer system further comprises means for providing multimedia material associated with a television program selected by the user to a web server.

33. The system defined in claim 32 wherein the means for providing multimedia material comprises means for providing interview video segments.

34. The system defined in claim 1 further comprising a satellite transmission link between the computer system and the web server.

35. The system defined in claim 1 wherein:
the Internet communications link comprises a telephone line; and
the web server provides web pages to the multimedia system over the telephone line.

36. A method for providing television program listings with embedded real-time data to a user at a multimedia system over an Internet communications link using an Internet television program guide system having a computer system and a web server, the method comprising the steps of:
providing television program listings with embedded real-time data with the computer system, said real-time data corresponding to events being televised live;
receiving the television program listings with embedded real-time data from the computer system with the web server; and
providing the television program listings with embedded real-time data corresponding to events being televised live to the multimedia system over the Internet communications link with the web server, so that the user can access the television program listings with embedded real-time data.

37. The method defined in claim 36 further comprising the step of receiving real-time data supplied by a real-time data processing facility with the web server.

38. The method defined in claim 37 further comprising the step of embedding the real-time data received from the real-time data processing facility within corresponding television program listings.

39. The method defined in claim 36 further comprising the step of providing multimedia material associated with the television program listings to the web server with the computer system.

40. The method defined in claim 36 wherein the step of providing real-time data further comprises the step of providing real-time data containing textual information to the web server with the computer system.

41. The method defined in claim 36 wherein the step of providing real-time data further comprises the step of providing real-time data containing video images to the web server with the computer system.

42. The method defined in claim 36 wherein the step of providing real-time data further comprises the step of providing real-time data containing video clips to the web server with the computer system.

43. The method defined in claim 36 wherein the step of providing real-time data further comprises the step of providing real-time data containing audio clips to the web server with the computer system.

44. The method defined in claim 36 wherein the step of providing real-time data further comprises the step of providing real-time data containing combinations of textual information, video clips, video images, and audio clips to the web server with the computer system.

45. The method defined in claim 36 further comprising the step of providing a go national option which the user selects to receive real-time data embedded within national television program listings.

46. The method defined in claim 36 further comprising the step of providing a go satellite option which the user selects to receive real-time data embedded within satellite television program listings.

47. The method defined in claim 36 further comprising the step of providing a go local option which the user selects to receive real-time data embedded within local television program listings.

48. The method defined in claim 47 further comprising the step of selecting a locality for the local television program listings.

49. The method defined in claim 48 wherein the step of selecting a locality comprises the step of accepting a zip code from which the locality is determined.

50. The method defined in claim 48 wherein the step of selecting a locality comprises the step of selecting a local region from a map.

51. The method defined in claim 48 further comprising the step of presenting a pick again web page when television program listings are not available for the selected locality.

52. The method defined in claim 36 further comprising the steps of:
providing a program guide option; and
presenting a program guide menu web page when the user selects the program guide option.

53. The method defined in claim 36 further comprising the step of providing a selectable option to arrange the television program listings by time.

54. The method defined in claim 36 further comprising the step of providing a selectable option to arrange the television program listings by channel.

55. The method defined in claim 36 further comprising the step of providing a selectable option to arrange the television program listings by category.

56. The method defined in claim 36 further comprising the step of searching the television program listings.

57. The method defined in claim 56 further comprising the step of searching the television program listings by title.

58. The method defined in claim 56 further comprising the step of searching the television program listings by category.

59. The method defined in claim 36 further comprising the step of allowing a user to select a given one of the television program listings with embedded real-time data.

60. The method defined in claim 59 further comprising the step of providing supplemental information on the selected television program listing with embedded real-time data.

61. The method defined in claim 60 further comprising the step of providing supplemental real-time information on same display screen.

62. The method defined in claim 60 further comprising the step of providing supplemental real-time and non-real-time information on a web page.

63. The method defined in claim 36 further comprising the step of providing the television program listings to the web server with a satellite transmission link between the computer system and the web server.

64. The method defined in claim 36 wherein the Internet communications link comprises a telephone line, the method further comprising the step of providing web pages to the multimedia system over the telephone line.

* * * * *

UNITED STATES PATENT AND TRADEMARK OFFICE
CERTIFICATE OF CORRECTION

PATENT NO.   : 6,268,849 B1
DATED        : July 31, 2001
INVENTOR(S)  : Franklin E. Boyer et al.

Page 1 of 1

It is certified that error appears in the above-identified patent and that said Letters Patent is hereby corrected as shown below:

Title page,
References Cited, OTHER PUBLICATIONS, change "Click TV" to -- ClickTV --;

Drawings,
FIG. 5, reference 326, change "ANNEAHEIM" to -- ANAHEIM --;
FIG. 7, under Current Conditions, change "HUMDIDITY" to -- HUMIDITY --;
FIG. 9, in listings (5 KTLA): change "SYLVESTOR" to -- SYLVESTER --;
FIG. 12, in listings (2:30PM): change "BASKTBALL" to -- BASKETBALL --;
FIG. 12, in listings (9:00PM): change "ENTERAINMENT" to -- ENTERTAINMENT --;
FIG. 14, in listings (1:00PM), change "BIRDCASE" to -- BIRDCAGE --.

Signed and Sealed this

Thirtieth Day of April, 2002

*Attest:*

JAMES E. ROGAN
*Director of the United States Patent and Trademark Office*

*Attesting Officer*

UNITED STATES PATENT AND TRADEMARK OFFICE
CERTIFICATE OF CORRECTION

Page 1 of 1

PATENT NO.       : 6,268,849 C1
APPLICATION NO.  : 90/020012
DATED            : March 3, 2014
INVENTOR(S)      : Franklin E. Boyer et al.

It is certified that error appears in the above-identified patent and that said Letters Patent is hereby corrected as shown below:

On the title page of the Ex Parte Reexamination Certificate:

In item "(73) Assignee:," change "JPMorgan Chase Bank, N.A., New York, NY (US)" to --United Video Properties, Inc., Santa Clara, CA (US)--.

Signed and Sealed this
Thirteenth Day of May, 2014

Michelle K. Lee
*Deputy Director of the United States Patent and Trademark Office*

(12) EX PARTE REEXAMINATION CERTIFICATE (10064th)
United States Patent
Boyer et al.

(10) Number: US 6,268,849 C1
(45) Certificate Issued: Mar. 3, 2014

(54) INTERNET TELEVISION PROGRAM GUIDE SYSTEM WITH EMBEDDED REAL-TIME DATA

(75) Inventors: Franklin E. Boyer, Cleveland, OK (US); Timothy B. Demers, Tulsa, OK (US)

(73) Assignee: JPMorgan Chase Bank, N.A., New York, NY (US)

Reexamination Request:
No. 90/020,012, Sep. 14, 2012

Reexamination Certificate for:
Patent No.: 6,268,849
Issued: Jul. 31, 2001
Appl. No.: 09/107,012
Filed: Jun. 30, 1998

Certificate of Correction issued Apr. 30, 2002

(51) Int. Cl.
*G06F 3/00* (2006.01)
*H04N 7/173* (2011.01)

(52) U.S. Cl.
USPC ............... 725/40; 348/E7.071; 707/E17.013; 709/217; 725/110; 725/37; 725/45

(58) Field of Classification Search
None
See application file for complete search history.

(56) References Cited

To view the complete listing of prior art documents cited during the proceeding for Reexamination Control Number 90/020,012, please refer to the USPTO's public Patent Application Information Retrieval (PAIR) system under the Display References tab.

*Primary Examiner* — Scott L. Weaver

(57) ABSTRACT

An Internet television program guide system is provided that allows a user at a multimedia system to access television program listings containing embedded real-time data over an Internet communications link. The television program listing may be for a sporting event that is currently being broadcast and the real-time data may be the current score of the event, the current weather where the event is taking place, or any other suitable real-time information on the event. The real-time data may be presented in the form of video stills, video clips, textual information, audio clips, or suitable combinations of such media. The user can perform database searches on the program guide listings to search for a desired program. If desired, the user can obtain additional information on a selected program by accessing an associated web page.

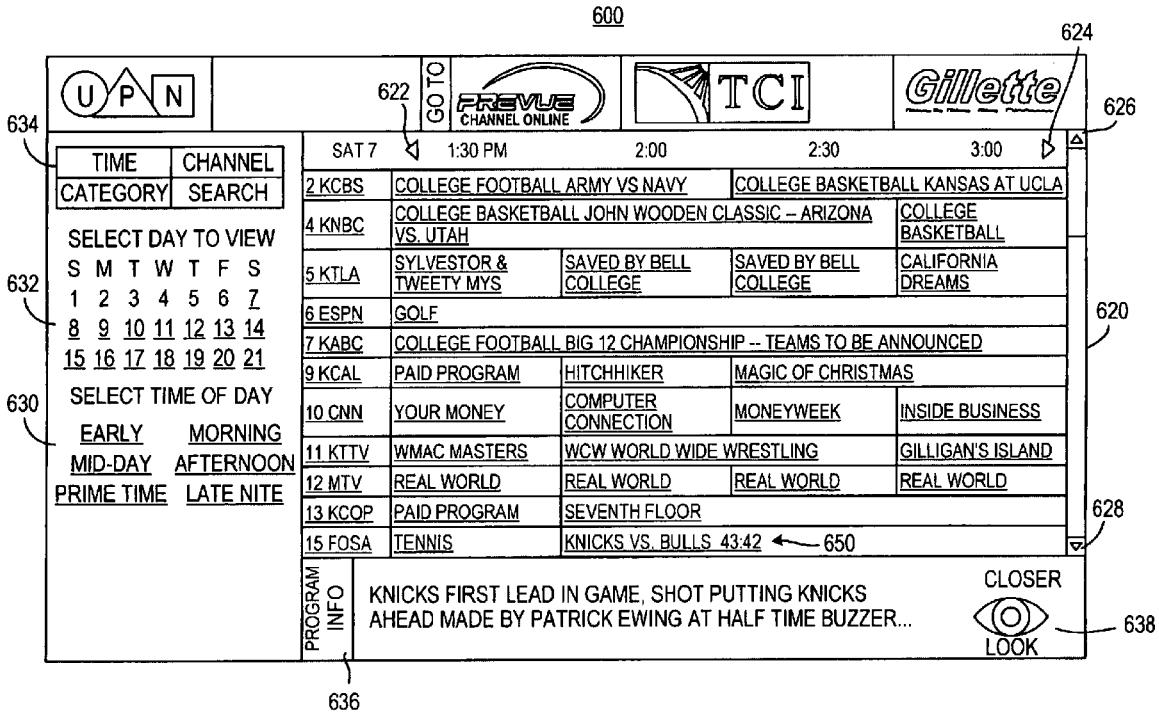

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-64 is confirmed.

* * * * *